(12) United States Patent
Morris et al.

(10) Patent No.: US 10,999,970 B2
(45) Date of Patent: May 11, 2021

(54) FRONT PTO IMPLEMENT AUTO CONNECT SYSTEM

(71) Applicant: DEERE & COMPANY, Moline, IL (US)

(72) Inventors: Spencer H. Morris, Thomson, GA (US); Santosh Khadasare, Pune (IN); Sean T. Miller, Woodward, IA (US)

(73) Assignee: DEERE & COMPANY, Moline, IL (US)

( * ) Notice: Subject to any disclaimer, the term of this patent is extended or adjusted under 35 U.S.C. 154(b) by 52 days.

(21) Appl. No.: 16/365,649

(22) Filed: Mar. 26, 2019

(65) Prior Publication Data

US 2020/0309196 A1  Oct. 1, 2020

(51) Int. Cl.
| | |
|---|---|
| *A01D 34/64* | (2006.01) |
| *F16D 3/84* | (2006.01) |
| *A01D 34/81* | (2006.01) |
| *A01D 67/00* | (2006.01) |

(52) U.S. Cl.
CPC ............. *A01D 34/64* (2013.01); *A01D 34/81* (2013.01); *A01D 67/005* (2013.01); *F16D 3/841* (2013.01)

(58) Field of Classification Search
CPC ...... A01D 34/64; A01D 34/66; A01D 34/661; A01D 34/662; A01D 34/81; A01D 69/002; A01D 67/00; A01D 67/005; A01D 2101/00; A01B 63/02; A01B 63/08; A01B 63/104; A01B 63/108; A01B 63/118; A01B 59/044; F16D 3/841
See application file for complete search history.

(56) References Cited

U.S. PATENT DOCUMENTS

| | | | | |
|---|---|---|---|---|
| 3,796,028 A | * | 3/1974 | Federspiel | A01D 34/64 56/15.2 |
| 3,796,502 A | * | 3/1974 | Federspiel | F16D 3/387 403/106 |
| 4,090,725 A | * | 5/1978 | Perin | A01B 59/062 172/272 |
| 4,621,699 A | * | 11/1986 | Slazas | B60K 17/28 180/53.7 |
| 5,018,344 A | * | 5/1991 | Samejima | A01D 43/077 56/13.3 |
| 5,203,149 A | * | 4/1993 | Youngberg | A01D 75/28 56/14.9 |

(Continued)

FOREIGN PATENT DOCUMENTS

| | | | |
|---|---|---|---|
| FR | 2792494 A1 | * 10/2000 | ............. F16H 57/04 |
| JP | 01148118 A | * 6/1989 | |

(Continued)

*Primary Examiner* — Laura Freedman

(57) ABSTRACT

A front PTO implement auto connect system includes a frame having a drive over surface and a pair of rear attachment members automatically and releasably engageable by a tractor rear draft linkage. The system includes a PTO coupling member mounted on the frame, and a front PTO shaft extending forwardly from the frame to a front PTO housing. A front attachment member on the front PTO housing is automatically and releasably engageable by a tractor front hanger. The front PTO implement auto connect system may be picked up with the same or similar linkages used to pick up a mid-mounted implement such as a mower deck.

15 Claims, 3 Drawing Sheets

(56) References Cited

U.S. PATENT DOCUMENTS

| | | | |
|---|---|---|---|
| 5,410,865 A * | 5/1995 | Kurohara | A01D 34/74 56/15.9 |
| 6,038,840 A * | 3/2000 | Ishimori | A01D 34/66 56/13.3 |
| 6,102,131 A * | 8/2000 | Malinowski | E02F 3/6273 172/273 |
| 7,240,470 B2 | 7/2007 | Clement et al. | |
| 7,685,800 B2 | 3/2010 | Sugio et al. | |
| 7,877,972 B2 | 2/2011 | Fox et al. | |
| 7,905,297 B2 | 3/2011 | Fox et al. | |
| 8,234,847 B2 | 8/2012 | Fox et al. | |
| 8,336,281 B2 | 12/2012 | Sugio et al. | |
| 8,720,173 B2 | 5/2014 | Sugio et al. | |
| 9,622,406 B2 | 4/2017 | Tada et al. | |

FOREIGN PATENT DOCUMENTS

| | | | |
|---|---|---|---|
| JP | 02107114 A * | 4/1990 | |
| JP | 06311812 A * | 11/1994 | |
| JP | 07147832 A * | 6/1995 | |
| JP | 10044799 A * | 2/1998 | |
| JP | 2015065885 A * | 4/2015 | |

* cited by examiner

FRONT PTO IMPLEMENT AUTO CONNECT SYSTEM

FIELD OF THE INVENTION

This invention relates generally to tractors and utility vehicles used for agricultural work and lawn care, and particularly to attaching implements to such tractors or vehicles. More specifically, the invention relates to a front PTO implement auto connect system.

BACKGROUND OF THE INVENTION

Auto connect systems are available for automatically connecting a mid-mounted implement when the tractor drives over the implement. For example, U.S. Pat. No. 7,240,470 for Drive Over Mower Deck, U.S. Pat. No. 7,905,297 for Automatic Connection for Mid-Mounted Implement, and U.S. Pat. Nos. 7,877,972 and 8,234,847 for Automatic Connection Mechanism for Mid-Mounted Implement, assigned to Deere & Company, describe a drive over mower deck that may be picked up under the tractor and automatically attached to the tractor's front and rear lift linkages, including a mid PTO mounted to the rear lift linkage. The rear lift linkage may include a pair of rear draft links that engage the rear of the mid-mounted implement. The forward lift linkage may be pivotably connected to the front end of the implement, and engage the forward end of the tractor frame. The mid PTO engages a PTO coupling member on the gearbox or top surface of the mid-mounted implement such as a mower deck. A similar system is shown in U.S. Pat. No. 9,622,406, for example.

Typically, the same mid PTO also may be used to power front PTO driven implements such as rotary brooms or snow blowers. However, this requires removing the auto connect system, including the front and rear lift linkages and mid PTO mounted to the rear linkage, then adding a forward extending front PTO shaft to the mid PTO. Substantial time and effort is required to switch between applications that share the tractor's mid PTO. Additionally, the front PTO shaft may be in the way of mid mower draft and loader designs.

An auto connect system is needed that remains on the tractor when a front PTO implement is used. An auto connect system for a front PTO implement is needed that does not require removing the auto connect system for mid-mounted mower decks, including the front and rear lift linkages and mid PTO mounted to the rear linkage. A front PTO implement auto connect system is needed that makes it relatively fast and easy to switch between applications that share the tractor's mid PTO. A front PTO implement auto connect system is needed that is not in the way of mid mower draft and loader designs.

SUMMARY OF THE INVENTION

A front PTO implement auto connect system includes a PTO coupling member that is releasably engageable with a mid-PTO coupling member on a tractor. A drive-over frame supports the PTO coupling member and includes at least one rear attachment member that is releasably engageable with a rear lift linkage of the tractor to lift the drive-over frame. A front PTO shaft is connected to the PTO coupling member and extends forwardly from the frame toward a front attachment member that is releasably engageable with a front hanger on the tractor.

The front PTO implement auto connect system remains on the tractor when a front PTO implement is used, and does not require removing the auto connect system for mid-mounted mower decks. As a result, the front PTO implement auto connect system makes it relatively fast and easy to switch between applications that share the tractor's mid PTO, and is not in the way of mid mower draft and loader designs.

DESCRIPTION OF THE PREFERRED EMBODIMENT

Figure 1:
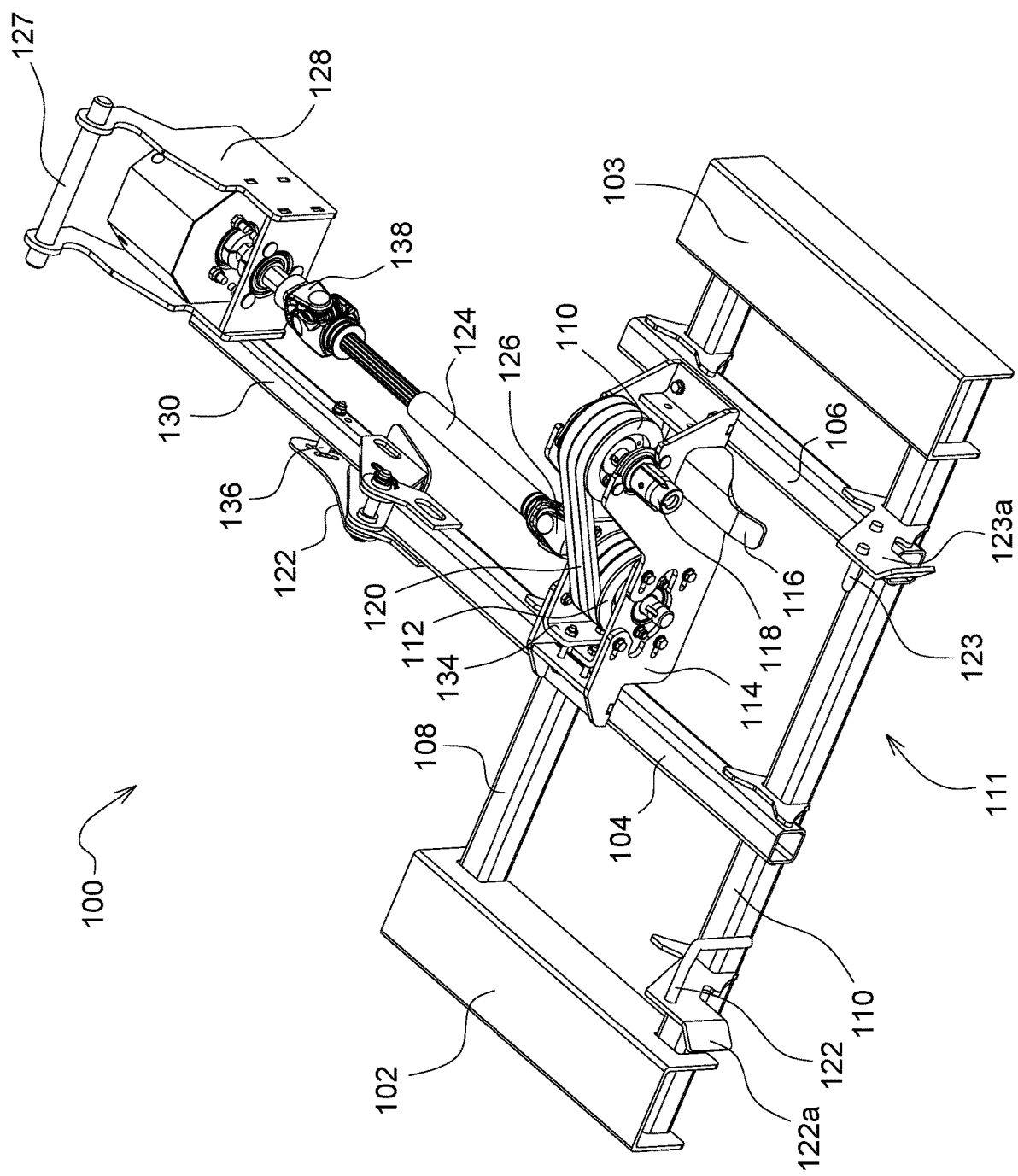
FIG. 1 is a top perspective view of a front PTO implement auto connect system according to a first embodiment of the invention.
Figure 2:
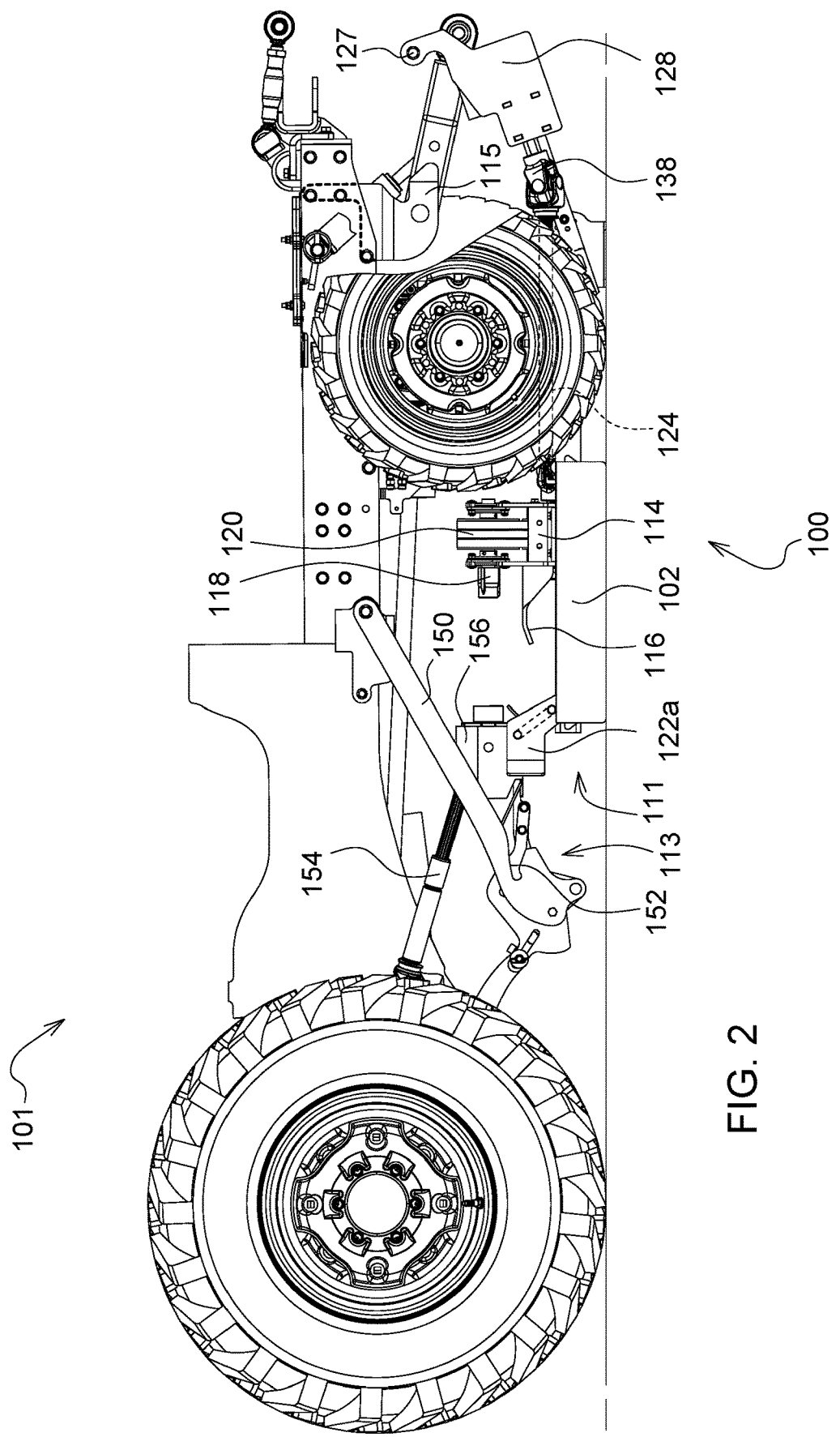
FIG. 2 is a side view of a front PTO implement auto connect system between a tractor's front and rear wheels before installation, according to a first embodiment of the invention.

FIGS. 1 and 2 show a first embodiment of front PTO implement auto connect system 100. The front PTO implement auto connect system may include frame 111. To install the front PTO implement auto connect system on a tractor, the operator may drive over frame 111 by positioning the frame flat on the ground and driving the front wheels and tires of the tractor on one or more drive-over surfaces 102, 103. For example, the drive-over surfaces may be ramps that are welded between the ends of front and rear cross members 108, 110. The drive-over surfaces may be sloped or horizontal, and may support one or both front wheels of the tractor while the frame lays horizontal on the ground. Instead of a pair of ramps, the front PTO implement auto connect system may have a drive-over surface that provides a sloped or horizontal cover extending over the frame that supports the tractor while the surface is driven over.

In one embodiment, front PTO implement auto connect system 100 may be picked up by a tractor using the same or similar linkages used to pick up a mid-mounted implement such as a mower deck. For example, after the tractor drives over the frame, the tractor may pick up the front PTO implement auto connect system using rear lift linkage 113 and front hanger(s) 115, each operating independently of the other. The rear lift linkage and front hanger(s) allow the front PTO implement auto connect system to be automatically and releasably connected to the tractor. FIG. 2 shows the frame of the front PTO implement auto connect system straddled between the front and rear wheels of the tractor. As will be explained in more detail below, the rear lift linkage and front hanger(s) may be positioned to pick up and automatically connect the system as the tractor continues to drive forward.

In one embodiment shown in FIG. 2, front PTO implement auto connect system 100 may be picked up using rear lift linkage 113 and front hanger(s) 115 on the tractor 101. Rear lift linkage 113 and front hanger(s) 115 may be substantially as described in U.S. Pat. No. 7,877,972, which is incorporated by reference. For example, rear lift linkage 113 may include a pair of rear draft links or arms 150 which may be pivotably attached to the tractor, preferably between the tractor's front and rear wheels. Each rear draft link may include a forward facing slot 152 at or adjacent the second or rear end of the rear draft link. Additionally, a rear link rod may connect together the pair of rear draft links at or adjacent their second or rear ends. The rear link rod may be suspended by left and right rear hanger(s) which may be pivotably attached to left and right rear lift support straps. Front hanger(s) 115 may be mounted to the front end of the tractor frame, with a pair of forward facing slots.

In one embodiment, front PTO implement auto connect system 100 may include rear attachment members 122, 123 at or near the rear edge of frame 111. For example, as shown in FIG. 1, rear attachment members 122, 123 may be a pair of rear lift rods, which may be wire forms. As the tractor moves forward, the left and right rear lift rods may enter slots 152 in rear draft links 150. Left and right rear mounting plates 122a, 123a may provide guide surfaces to help direct the rear draft links laterally inwardly so that rear lift rods 122, 123 are properly aligned to enter the slots. Once the rear lift rods fully enter the slots, the rear lift rods may be automatically and releasably held in place by lock plates or other mechanisms that ride over and secure the rear lift rods in the slots, and may be biased or urged by gravity to a closed or locked position. Alternatively, the rear draft links may be rods that engage slots or hooks on the rear attachment members.

In one embodiment, the rear draft links may raise and lower the front PTO implement auto connect system using a hydraulic lift cylinder or an electric actuator on the tractor. The hydraulic lift cylinder or electric actuator may be connected to a bell crank to assist in lifting or lowering the front PTO implement auto connect system from the ground surface. Alternatively, a manually operated lever may be connected to the bell crank for raising and lowering the frame.

In one embodiment, front PTO implement auto connect system 100 may include PTO coupling member 118 that may be automatically connected to a tractor's mid-mounted PTO coupling member 156 as the tractor moves forward. The mid-mounted PTO on the tractor may be substantially as described in U.S. Pat. No. 7,877,972, which is incorporated by reference. Mid-PTO coupling member 156 may be attached to the forward end of mid-mounted PTO 154, and also may be mounted to rear lift linkage 113. This helps mid-PTO coupling member 156 to be properly aligned for automatically and releasably engaging PTO coupling member 118 on front PTO implement auto connect system 100. For example, mid-PTO coupling member 156 may be a female PTO coupling member mounted to rear lift linkage 113, and PTO coupling member 118 may be a male PTO coupling member on the front PTO implement auto connect system. Alternatively, mid-PTO coupling member 156 may be a male PTO coupling member mounted on the rear lift linkage and PTO coupling member 118 may be a female PTO coupling member on the front PTO implement auto connect system.

In one embodiment, mid-PTO coupling member 156 on tractor 101 may automatically and releasably engage PTO coupling member 118 on front PTO implement auto connect system 100. The mid-PTO coupling member may be rotatably mounted in a bearing housing or carrier. The bearing housing or carrier may be supported by a coupler support, which may be attached to a rear draft link 150 so that the coupler support, and the first PTO coupling member, can move or slide vertically with respect to the rear draft link.

In one embodiment, front PTO implement auto connect system 100 may include rear mounting plates 122a, 123a which may guide the rear draft links laterally so that lift rods 122, 123 may enter slots 152 in the rear draft links. Rear mounting plates 122a, 123a also may help guide mid-PTO coupling member 156 into correct engagement position with the PTO coupling member 118 on the front PTO implement auto connect system. Mounting the mid-PTO coupling member to the rear lift linkage places it in correct position to engage the opposing PTO coupling member 118 on the front PTO implement auto connect system. Additionally, coupler alignment ramp 116 may be provided on belt housing 114 to help ensure the PTO coupling members are in the correct vertical position for engagement. Coupler alignment ramp 116 may be a sloped surface extending rearwardly from the belt housing adjacent the coupling member 118 on the front PTO implement auto connect system. The mid-PTO coupling member 156 may slide or ride slightly upwardly on the coupler alignment ramp toward the same vertical position as PTO coupling member 118.

In one embodiment, front PTO implement auto connect system 100 may include a belt and pulley mechanism or another similar device that may be used to offset the axis of front PTO shaft 124 from the tractor's mid PTO shaft 154. For example, the belt and pulley arrangement may include belt housing 114, drive pulley 110, driven pulley 112, and one or more belts 120 connecting the drive pulley and driven pulley. Belt housing 114 may be attached to first and second longitudinal support members 104, 106 which may be part of frame 111. Drive pulley 110 may be rotatably mounted to the belt housing on the axis of the tractor's mid PTO shaft 154. Driven pulley 112 may be rotatably mounted to the belt housing on the axis of front PTO shaft 124. Optionally, at least one pulley may be mounted with belt tensioning bracket 134 to the belt housing. Alternatively, the front PTO implement auto connect system may include another similar device such as a gearbox so that the front PTO shaft may have a rotational axis that is offset relative to the mid PTO shaft.

In one embodiment, front PTO implement auto connect system 100 may include front PTO housing 128, front PTO shaft 124 which may extend forwardly from frame 111 to front PTO housing 128, and front attachment member 127 located on or adjacent the front PTO housing. Additionally, the system may include a support or biasing mechanism for holding the front PTO housing off the ground so that the front attachment member may be automatically engaged by the tractor. As shown in FIG. 1, the support or biasing mechanism may be kick stand 122 having one or more slots or detents 136 that may be used to support draft arm 130 at a desired upward angle. The support or biasing device may raise the front attachment member to substantially the same height as front hanger(s) 115 on the tractor. The rearward end of draft arm 130 may be pivotably mounted to first longitudinal support member 104, and the forward end may extend forwardly to support front PTO housing 128 and front attachment member 127 off the ground surface and above the frame. Additionally, the rearward end of front PTO shaft 124 may be connected by universal joint 126 to drive pulley 112, and the forward end may extend forwardly above the frame where it may be connected by universal joint 138 to the front PTO housing. After the tractor's front wheels drive over frame 111, the tractor may continue to move forward so that front hanger(s) 115 may engage front attachment member 127. For example, the front attachment member may be a cross bar that extends horizontally at or adjacent the top front end of the front PTO housing. A front PTO implement such as a rotary broom or snow blower then may be connected to and powered by the front PTO housing while the front PTO implement is supported by the tractor front lift system.

Figure 3:
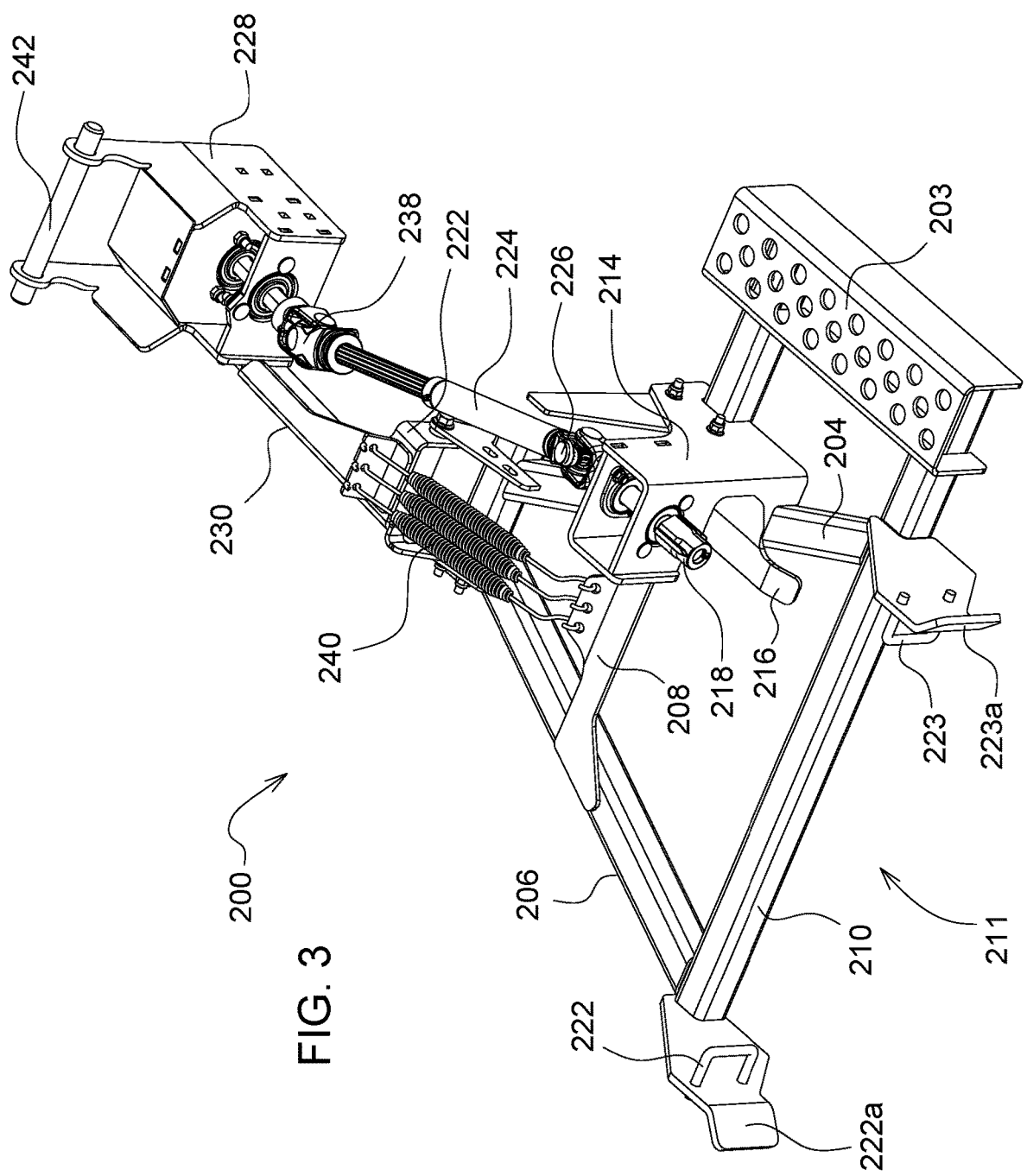
FIG. 3 is a top perspective view of a front PTO implement auto connect system according to a second embodiment of the invention.

In a second embodiment, as shown in FIG. 3, front PTO implement auto connect system 200 may include frame 211 having a single drive-over ramp 203. To install the front PTO implement auto connect system on a tractor, the operator may drive the tractor over frame 211 by positioning the right front wheel and tire on drive-over ramp 203. Drive-over ramp 203 may be welded to the left or right ends of front and rear cross members 208, 210. The cross members also may be connected together by support members 204, 206 so that the frame may be triangular in shape when viewed from above. Alternatively, the frame may include a top surface or cover structure that may support the tractor.

In a second embodiment, front PTO implement auto connect system 200 may include attachment members 222, 223 at or near the rear edge of frame 211. For example, as shown in FIG. 3, attachment members 222, 223 may be a pair of rear lift rods, which may be wire forms. Left and right rear mounting plates 222a, 223a may provide guide surfaces to help direct the tractor's rear draft links laterally inwardly so that rear lift rods 222, 223 are properly aligned to enter the slots in the rear draft links. Once the rear lift rods fully enter the slots, the rear lift rods may be automatically and releasably held in place by lock plates or other mechanisms that ride over and secure the rear lift rods in the slots, and may be biased or urged by gravity to a closed or locked position.

In a second embodiment, front PTO implement auto connect system 200 may include PTO coupling member 218 that may be automatically connected to a tractor's mid-mounted PTO coupling member as the tractor moves forward. The mid-mounted PTO on the tractor may be substantially as described in U.S. Pat. No. 7,877,972, which is incorporated by reference. The mid-PTO coupling member on the tractor may automatically and releasably engage PTO coupling member 218 on front PTO implement auto connect system 200.

In a second embodiment, front PTO implement auto connect system 200 may include rear mounting plates 222a, 223a which may guide the rear draft links laterally so that lift rods 222, 223 may enter slots in the rear draft links. Rear mounting plates 222a, 223a also may help guide the mid-PTO coupling member into correct engagement position with the PTO coupling member 218 on the front PTO implement auto connect system. Mounting the mid-PTO coupling member to the rear lift linkage places it in correct position to engage the opposing PTO coupling member 218 on the front PTO implement auto connect system. Additionally, coupler alignment ramp 216 may be provided on coupling support 214 to help ensure the PTO coupling members are in the correct vertical position for engagement. Coupler alignment ramp 216 may be a sloped surface extending rearwardly from the coupler support adjacent coupling member 218 on the front PTO implement auto connect system. Coupler support 214 may be attached to frame 211. The mid-PTO coupling member may slide or ride slightly upwardly on the coupler alignment ramp toward the same vertical position as PTO coupling member 218.

In one embodiment, front PTO implement auto connect system 200 may include front PTO shaft 224 extending forwardly from frame 211 to front PTO housing 228. The front PTO housing 228 may be supported or biased off the ground where it may be automatically engaged by the tractor. As shown in FIG. 3, the front PTO implement auto connect system may include a biasing mechanism such as coil springs 240 that can urge draft arm 230 at an upward angle. The coil springs provide an example of a biasing device that raises the front attachment member 242 to substantially the same height as front hanger(s) on the tractor. The rearward end of draft arm 230 may be pivotably mounted to frame member 222, and the forward end may extend upwardly to support front PTO housing 228. The rearward end of front PTO shaft 224 may be connected by universal joint 226 to PTO coupling member 218, and the forward end may extend forwardly where it may be connected by universal joint 238 to the front PTO housing. After frame 211 is positioned between the tractor's front and rear wheels, the tractor may continue to move forward so that front hanger(s) may engage the ends of front attachment member 242. For example, the front attachment member may be a bar or rod that extends horizontally positioned across the top front end of the front PTO housing. Alternatively, the front attachment member may be a slot or hook, and the front hanger(s) may be one or more rods mounted on the front of the tractor. A front PTO implement such as a rotary broom or snow blower then may be connected to and powered by the front PTO housing while the front PTO implement is supported by the tractor front lift system.

Having described the preferred embodiment, it will become apparent that various modifications can be made without departing from the scope of the invention as defined in the accompanying claims.

The invention claimed is:

1. A front power take-off (PTO) implement auto connect system, comprising:
    a frame having a drive over surface and a pair of rear attachment members automatically and releasably engageable by a tractor rear draft linkage;
    a PTO coupling member mounted on the frame;
    a front PTO shaft extending forwardly from the frame to a front PTO housing; and
    a front attachment member on the front PTO housing that is automatically and releasably engageable by a tractor front hanger.

2. The front PTO implement auto connect system of claim 1 further comprising a support mechanism raising the front PTO housing and front attachment member off a ground surface.

3. The front PTO implement auto connect system of claim 1 wherein the PTO coupling member is automatically and releasably engageable with a tractor mid PTO coupling member.

4. The front PTO implement auto connect system of claim 3, wherein the front PTO shaft is on a different axis than a mid PTO shaft of a tractor.

5. The front PTO implement auto connect system of claim 1 wherein the tractor rear draft linkage includes a pair of rear draft links with slots for engaging the rear attachment members.

6. The front PTO implement auto connect system of claim 5 further comprising rear mounting plates adjacent the rear attachment members, the rear mounting plates having guide surfaces to align the rear attachment members with the slots.

7. A front power take-off (PTO) implement auto connect system, comprising:
    a PTO coupling member that is releasably engageable with a mid-PTO coupling member on a tractor;
    a drive-over frame supporting the PTO coupling member, the drive-over frame having a rear attachment member that is releasably engageable with a rear lift linkage of the tractor to lift the drive-over frame; and
    a front PTO shaft connected to the PTO coupling member and extending forwardly from the frame toward a front attachment member that is releasably engageable with a front hanger on the tractor.

8. The front PTO implement auto connect system of claim 7, further comprising a front PTO housing supporting the front attachment member.

9. The front PTO implement auto connect system of claim 7 wherein the front PTO shaft is on an axis that is offset from the mid-PTO coupling member.

10. The front PTO implement auto connect system of claim 7, further comprising a support mechanism to hold the front PTO shaft above the frame.

11. The front PTO implement auto connect system of claim 7, further comprising a biasing mechanism to urge the front PTO shaft to a position above the frame.

12. A front power take-off (PTO) implement auto connect system, comprising:
   a front PTO shaft;
   a PTO coupling member connected to a rear end of the front PTO shaft;
   a drive-over frame supporting the PTO coupling member; and
   a pivotable draft arm extending forward from the frame and supporting a front PTO housing and a forward end of the front PTO shaft.

13. The front PTO implement auto connect system of claim 12 wherein the drive-over frame includes at least one ramp.

14. The front PTO implement auto connect system of claim 12 further comprising at least one attachment member on the drive-over frame.

15. The front PTO implement auto connect system of claim 12 further comprising a belt and pulley arrangement between the PTO coupling member and the front PTO shaft.

* * * * *